(12) United States Patent
Fox

(10) Patent No.: US 8,814,746 B2
(45) Date of Patent: Aug. 26, 2014

(54) TWO-ARRAY PLANETARY GEAR SYSTEM WITH FLEXPINS AND HELICAL GEARING

(75) Inventor: Gerald P. Fox, Massillon, OH (US)

(73) Assignee: The Timken Company, North Canton, OH (US)

( * ) Notice: Subject to any disclaimer, the term of this patent is extended or adjusted under 35 U.S.C. 154(b) by 143 days.

(21) Appl. No.: 13/640,163

(22) PCT Filed: Apr. 13, 2011

(86) PCT No.: PCT/US2011/032241
§ 371 (c)(1),
(2), (4) Date: Oct. 9, 2012

(87) PCT Pub. No.: WO2011/130360
PCT Pub. Date: Oct. 20, 2011

(65) Prior Publication Data
US 2013/0029802 A1    Jan. 31, 2013

Related U.S. Application Data

(60) Provisional application No. 61/324,583, filed on Apr. 15, 2010.

(51) Int. Cl.
*F16H 57/08* (2006.01)
*F16H 1/28* (2006.01)

(52) U.S. Cl.
USPC ............................ 475/331; 475/344; 475/348

(58) Field of Classification Search
USPC .......... 475/331, 340, 342, 346, 344, 347, 348
See application file for complete search history.

(56) References Cited

U.S. PATENT DOCUMENTS 6,994,651 B2    2/2006  Fox
7,297,086 B2    11/2007 Fox (Continued)

FOREIGN PATENT DOCUMENTS

DE    19712516 A1    10/1998

(Continued)

OTHER PUBLICATIONS

English translation of DE19712516A1, Apr. 24, 2014, htt://translationportal.epo.org.*
International Search Report from corresponding International Application No. PCT/US2011/032241 dated Jun. 24, 2011.
Written Opinion from from corresponding International Application No. PCT/US2011/032241 dated Jun. 24, 2011.

*Primary Examiner* — Roger Pang
(74) *Attorney, Agent, or Firm* — Michael Best & Friedrich LLP

(57) ABSTRACT

A planetary gear system (P) includes a sun gear (2), a ring gear (4) a carrier (6) located between the sun and ring gears (2, 4), and planet pinions (8, 10) organized in two arrays and supported on flexpin assemblies (32, 34) in the carrier (6). All of the gearing is helical, with the sun and ring gears (2, 4) having their teeth arranged in at double helix angles (herringbone) and the planet gears (8, 10) at single helix angles. The pinions (8) of the one array engage the teeth of one angle on the sun and ring gears (2, 4) and the pinions (10) of the other array engage the teeth of the other angle on the sun and ring gears (2, 4). Torque transfers through the carrier (6) through two torque paths (a, b)—one to the flexpin assemblies (32) for one array and the other to the flexpin assemblies (34) of the other array—and the paths (a) is stiffer than the path (b). Owing to the helical cut of the teeth the planet pinions (8, 10) of the two arrays exert oppositely directed axial forces (A) on the sun gear (2). The sun gear (2) is free to shift axially or float with respect to the planet pinions (8, 10) of the two arrays, so the axial forces (A) imparted to the sun gear, while opposite, are equal. Hence, the tangential forces (T), which transfer the torque, are likewise equal, notwithstanding the difference in flexibility of the two torque paths (a, b). Even though the carrier (6) may undergo different deflections at the flexpin assemblies (32, 34) for the two arrays of planet pinions (8, 10), the planet pinions (8, 10) of the two arrays transfer torques of equal magnitude.

17 Claims, 3 Drawing Sheets

(56) References Cited

U.S. PATENT DOCUMENTS

| | | |
|---|---|---|
| 2006/0142114 A1 | 6/2006 | Fox |
| 2009/0163316 A1* | 6/2009 | Saenz De Ugarte et al. . 475/348 |
| 2010/0167867 A1* | 7/2010 | Sugitani ........................ 475/339 |
| 2010/0261571 A1 | 10/2010 | Matsuoka et al. |
| 2010/0296934 A1* | 11/2010 | Warren .................... 416/170 R |

FOREIGN PATENT DOCUMENTS

| | | |
|---|---|---|
| EP | 0505140 A1 | 9/1992 |
| EP | 1559928 A2 | 8/2005 |
| JP | 2009275913 A | 11/2009 |
| WO | 2009102853 A1 | 8/2009 |
| WO | 2009152306 A1 | 12/2009 |

* cited by examiner

TWO-ARRAY PLANETARY GEAR SYSTEM WITH FLEXPINS AND HELICAL GEARING

CROSS REFERENCE TO RELATED APPLICATIONS

This application derives priority from and otherwise claims the benefit of U.S. provisional application 61/324,583 filed 15 Apr. 2010, and international application PCT/US2011/032241 filed 13 Apr. 2011 (WO2011/130360), both of which are incorporated herein by reference.

TECHNICAL FIELD

This invention relates in general to planetary gear systems, and more particularly to a planetary gear system having helical gearing and planet pinions arranged in two arrays on flexpins with compensation for carrier deflection.

BACKGROUND ART

A planetary or epicyclic gear system having its planet pinions organized in two opposing arrays on flexpins has the capacity to transfer a large amount of torque in a small package, that is to say, it possesses a high power density. See U.S. Pat. No. 7,297,086. The system of that patent utilizes spur gears. Its planet pinions rotate on flexpins that are cantilevered from two carrier walls and mesh with a sun gear and a ring gear. One of the carrier walls is connected to a torque reaction member that can either anchor the carrier against rotation or rotate and transfer torque from that wall directly into another drive line component farther down the system. Irrespective of whether the carrier is anchored against rotation or rotates, torque transfer from the torque reaction member to the flexpins on both carrier walls. The torque transfer path to the flexpins on the carrier wall to which the torque reaction member is connected will be inherently stiffer than the torque transfer path to the flexpins on the opposite carrier wall, because the torque transfer path to the opposite carrier wall also includes the webs that connect the two carrier walls and have an associated torsional spring rate that makes the combined spring rate for the flexpins on the opposite wall weaker. In other words, a design as depicted in U.S. Pat. No. 7,297,086 with spur gears, without consideration of how to achieve torque transfer equalization, will inherently transfer different values of torque through each planetary array, because there are different torsional spring rates in the two torque paths. The stiffer torque transfer path will transfer more torque and power than the weaker torque transfer path that includes the webs. This is a problem, because to take full advantage of flexpin technology to achieve maximum downsizing, a two-array planetary system must actually transfer the same nominal value of torque and power through each array and hence through each torque path. In other words, all planetary gears should transfer nominally equal torque.

PCT/US09133896 (WO 2009/102853) offers corrective measures that might be taken if flexpins are fitted with spur gearing as shown in the illustrations. Without correction, a typical value of torque transfer side to side in a spur gear system might be (for discussion purposes) on the order of 35% through the weaker torque transfer path and 65% through the stiffer torque transfer path. This means that in this example the stiffer torque transfer path would transfer 85% more torque than the weaker one. Ideally, all the gears and the bearings associated with them will benefit if both torque transfer paths can transfer equal values—that is, 50% of the total torque through each torque transfer path. PCT/US09/33896 discloses methods that are intended to achieve equal torque transfer in both transfer paths. These methods are described for a planetary gearing system shown equipped with spur gears and include using flexpins having different spring characteristics and locating the stiffer flexpins on the carrier side that is weaker; using less gear backlash in the gears on the weaker carrier side to force earlier gear contact, indexing the less stiff carrier side ahead of the stiffer side to force more load on it, and varying the stiffness of the carrier walls to achieve more equal global stiffness in both torque transfer paths.

Helical gears operate smoothly and often with less noise than spur gears. Moreover, the teeth on helical gears are longer and stronger than the teeth of spur gears of equivalent size. But helical gearing has not found favor in planetary systems that utilize flexpins because the planet pinions experience thrust loads at the meshes between the sun gear and planet pinions and at the meshes between the ring gear and planet pinions. Indeed, the thrust loads are in opposite directions and produce a couple that will tilt the planet pinions and disturb the mesh with the sun and ring gears unless counteracted. PCT/US2009/043007 (WO 2009/152306) discloses means for inhibiting the unwanted deflection that the couple would otherwise produce. But flexpins will otherwise maintain a good mesh between the planet pinions and the sun and ring gears, whether the gearing be spur or helical, and thus offer advantages over the end-to-end anchoring of planet pinion pins as in straddle-type carriers.

BEST MODES FOR CARRYING OUT THE INVENTION

Figure 1:
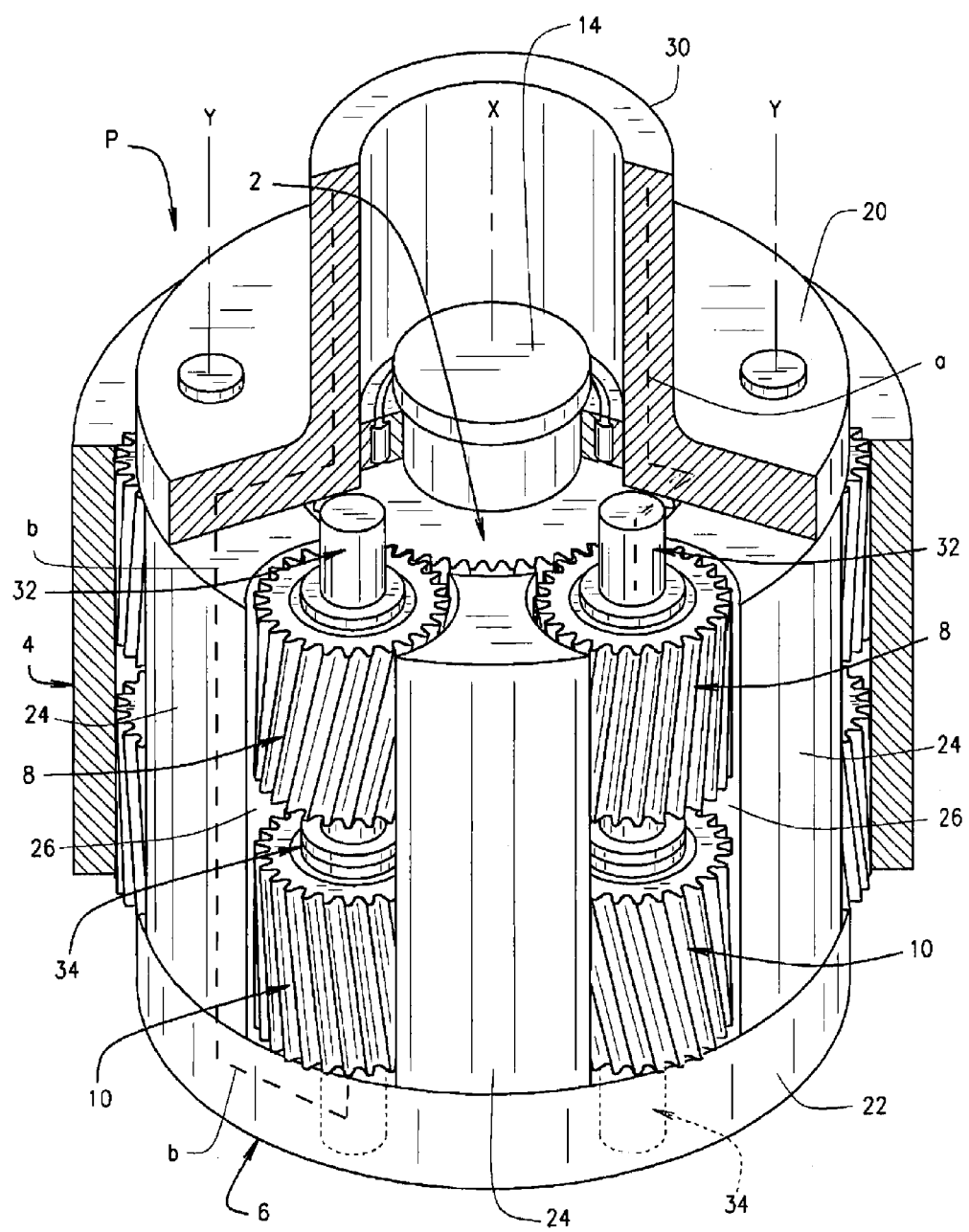
FIG. 1 is a perspective view, partially broken away and in section, of a planetary gear system constructed in accordance with an embodying the present invention.

Referring now to the drawings, an epicyclic or planetary gear system P (FIG. 1) that is organized about an main axis X includes a sun gear 2 located along the axis X, a ring gear 4 surrounding the sun gear 2, a carrier 6 located generally between the sun gear 2 and ring gear 4, and planet pinions 8 and 10 supported on the carrier 6 and engaged with the sun gear 2 and the ring gear 4. The planet pinions 8 and 10 rotate about offset axes Y that lie parallel to the main axis X. The planet pinions 8 form one array, whereas the planet pinions 10 form another array, there being for every planet pinion 8 another planet pinion 10 with which it aligns, thus forming a set of planet pinions 8, 10. The sun and ring gears 2, 4 are helical as are the planet pinions 8, 10. But the teeth of the sun gear 2 and ring gear 4 form two helix angles that are opposite, that is to say they are herringbone gears. The teeth of the planet pinions 8 and 10 form single angle helix angles, with the helix angle for the planet pinions 8 being opposite from the helix angle for the planet pinions 10. Actually, the sun gear 2 may take the form of two separate single helix gears with the teeth of one cut at an angle opposite to the angle of the other, but the two gears must be fixed in position with respect to each other so that they in effect are halves of a single gear. The same holds true for the ring gear 4. While the helix angles on the sun gear 2 and ring gear 4 are opposite, they are equal. Likewise the helix angles of the planet pinions 8 and 10, while being opposite, are equal. The planetary system A is well suited for use in the transmissions of wind turbines to transfer the torque generated by a wind-powered rotor to a higher velocity suitable for driving an electrical generator of moderate size. In such an installation the ring gear 4 remains fixed against rotation, torque is delivered to the carrier 6 and it rotates, and lesser torque is taken from the sun gear 2 at a higher angular velocity. However, in other transmissions any one of the sun gear 2, the ring gear 4, and the carrier 6 may remain fixed, while the other two rotate. Even so, all three are subjected to torque, and the one that does not rotate must be fixed to restrain it from rotating under the torque applied to it.

Figure 2:
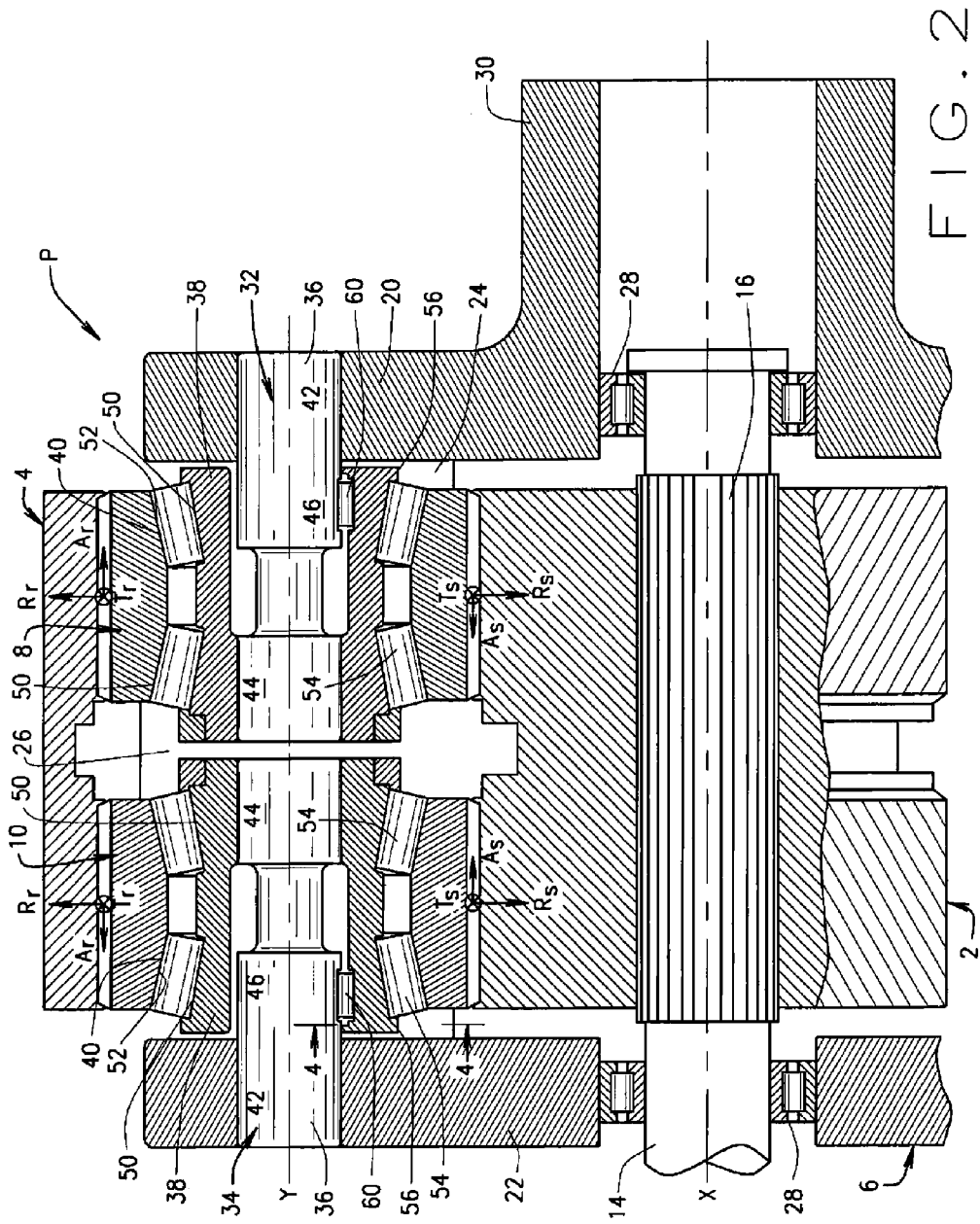
FIG. 2 is a partial longitudinal sectional view of the gear system.

The sun gear 2 is mounted on a shaft 14 (FIG. 2) that lies along the axis X and extends beyond one or both ends of the carrier 6. While the sun gear 2 cannot rotate on the shaft 14, it can shift axially on the shaft 14 so that it can "float" between the array of planet pinions 8 and the array of planet pinions 10. To this end, the sun gear 2 is coupled to the shaft 14 through mating splines 16 that permit it to slide axially along the shaft 14. In contrast, the shaft 14 can rotate relative to the ring gear 4 and carrier 6 and vice versa.

The carrier 6 encircles the shaft 14 and sun gear 2 and lies within the ring gear 4. It includes (FIGS. 1 & 2) an end wall 20 located opposite the array of planet pinions 8 and another end wall 22 located opposite the array of planet pinions 10. In addition, it has webs 24 that firmly connect the two end walls 20 and 22 and provide pockets 26 that the planet pinions 8 and 10 occupy. Indeed, the planet pinions 8 and 10 project radially from the pockets 26 to engage the sun gear 2 and ring gear 4. At its two end walls 20 and 22 the carrier 6 has bearings 28 that support the shaft 14, enabling it to rotate in the carrier 6 around the axis X. The two bearing 28 may take the form any one of several types of antifriction bearings or simple plain bearings. The end wall 20 is fitted with coupling 30, such as a collar, yoke flange, or other torque reaction element for connecting it to a rotor or other device that applies torque to it or through it.

The carrier 6 further includes (FIG. 2) flexpin assemblies 32 and 34 on which the planet pinions 8 and 10 rotate, respectively, with the flexpin assemblies 32 for the pinions 8 being supported on the end wall 20 and the flexpin assemblies 34 for the pinions 10 being supported on the other end wall 22. Each pocket 26 of the carrier 6 contains a flexpin assembly 32 and a flexpin assembly 34, but within any pocket 26 the flexpin assemblies 32 and 34, while being generally aligned along the offset axis Y for that pocket 26 to form a set, are detached, that is to say, they are not connected to each other.

Figure 3:
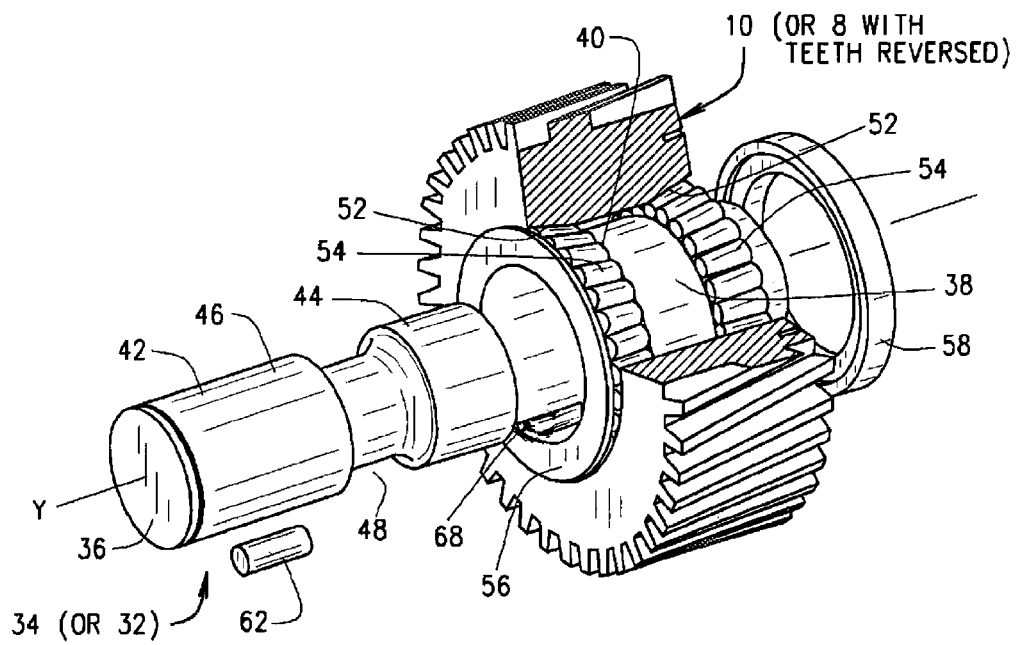
FIG. 3 is an exploded perspective view, partially broken away and in section, of one of the flexpin assemblies for the planetary gear system.
Figure 4:
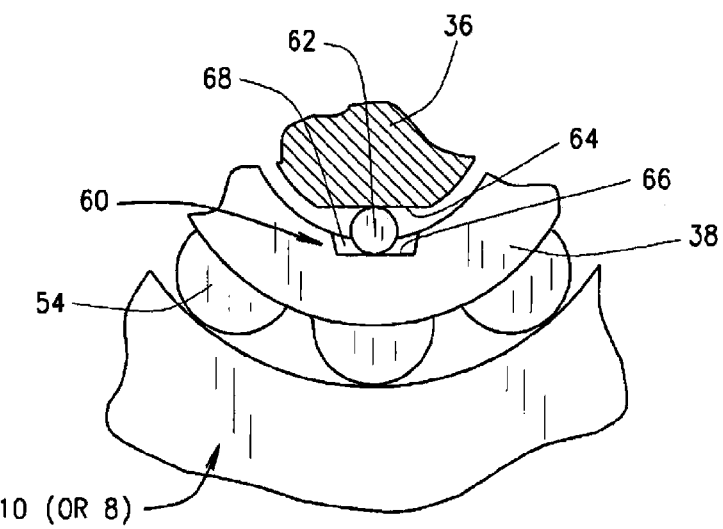
FIG. 4 is a sectional view taken along line 4-4 of FIG. 2 and showing a deflection inhibitor for a flexpin assembly.

Each flexpin assembly 32 and 34 includes (FIGS. 2 & 3) a flexpin 36, which at one of its ends is firmly anchored in or attached to one of the end walls 20 or 22 and projects axially into a pocket 26 between two of the webs 24. Each flexpin assembly 32 and 34 also has a sleeve 38 that is fitted firmly to the flexpin 36 at the end of the pin 36 that is remote from the wall 20 or 22 where pin 36 is anchored. The sleeve 38 extends back over the flexpin 36, and apart from the end at which it is mounted on the flexpin 36, the sleeve 38 is spaced radially from the flexpin 36. The planet pinion 8 or 10 for the flexpin assembly 32 or 34 surrounds the sleeve 38 and rotates on a bearing 40 located between it and the sleeve 38.

More specifically, each flexpin 36 includes (FIGS. 2 & 3) a base 42 that is anchored firmly in or otherwise fitted securely to the end wall 20 or 22 from which the flexpin 36 projects. Here the flexpin 36 is cantilevered from the end wall 20 or 22. At its other end, that is the end remote from the end wall 20 or 22, the flexpin 36 has a head 44. Between the base 42 and the head 44 the flexpin 36 has a shank 46 that may be provided with a groove 48 to impart greater flexibility to the flexpin 36 near its head 44. The sleeve 38 for the flexpin 36 fits securely over the head 44 and extends back over the shank 46 toward the end wall 20 or 22, but here it is radially spaced slightly from the shank 44, so that the sleeve 38 can displace with respect to the flexpin 36, at least circumferentially, reference being to the axis X. The arrangement creates a double cantilever—one cantilever at the base 42 and the other at the head 44. Indeed, the sleeve 38 and flexpin 36 may be formed integral at the head 44 of the latter. The bearing 40 for the flexpin 36 encircles the sleeve 38 and lies within the pinion 8 or 10 for the flexpin 36. It may take the form of an antifriction bearing such as a double row tapered roller, an angular contact ball, or a spherical roller bearing, or a single or double row cylindrical roller bearing, or a plain bearing.

Preferably the bearing 40 is a double row tapered roller bearing that is integrated into the sleeve 38 and the planet gear 8 or 10 to provide an integrated flexpin assembly 32 or 34. When so integrated, the bearing 40 has a pair of inner raceways 50 formed on the sleeve 38 and a pair of outer raceways 52 formed on the planet gear 8 or 10. The raceways 50 are inclined in opposite directions and so are the raceways 52. Moreover, for each inner raceway 50, one of the outer raceways 52 lies opposite to it, and that outer raceway 52 is inclined in the same direction as the inner raceway 50. Similarly inclined raceways 50 and 52 at one end of the sleeve 38 are separated by a row of rolling elements 54 and likewise similarly inclined raceways 50 and 52 at the other end of the sleeve 38 are separated by another row of rolling elements 54. Completing the integrated bearing 40 is an integral thrust rib 56 at one end of the sleeve 38 and an initially separate rib ring 58 at the other end of the sleeve 38. The rib ring 58 facilitates assembly and adjustment of the bearing 40, and once fitted to the sleeve 38 unitizes the bearing 40, all as set forth in U.S. Pat. No. 6,994,651, which is incorporated herein by reference. The bearing 40, accommodates radial loads, and owing to the inclination of its raceways 50 and 52, thrust loads in both axial directions as well.

When torque transfers through the flexpin assembly 32 or 34, the double cantilever formed by the flexpin 36 and the sleeve 38 that surrounds it enables the offset axis Y about which the pinion 8 or 10 rotates to remain parallel to the main axis X, and this ensures a good mesh between the teeth on the pinion 8 or 10 and the teeth on the sun gear 2 and ring gear 4. More specifically, as torque is applied to the carrier 6 and transferred to flexpin assembly 32 or 34 at its end wall 20 or 22, the flexpin 36 will flex generally circumferentially adjacent to the wall 20 or 22, reference being to the main axis X. It will also flex circumferentially behind its head 44, so that the sleeve 38—and the offset axis Y for it—remains parallel the main axis X. However, the axial load imparted by the helical configuration of the teeth also urges the flexpin 36 to flex radially near the head 44 in containing the axis X of the planetary system A and the axis Y for the flexpin assembly 32 or 34.

The radial deflection will disturb the mesh between the pinion 8 or 10 and the sun gear 2 and ring gear 4. To prevent this unwanted radial deflection, a deflection inhibitor 60 is interposed between the shank 46 of the flexpin 36 and sleeve 38 adjacent to the end wall 20 or 22. It may take the form of a roller 62 located between a land 64 on the flexpin 38 and another land 66 in the sleeve 38, with the latter being at the bottom of a pocket 68 that confines the roller 62 both laterally and axially. PCT/US2009/043007 (WO 2009/152,306), which is incorporated herein by reference, discloses other configurations for the inhibitor 60 that should prevent deflection in a plane defined by the offset axis Y for the flexpin 36 and the main axis X.

In the operation of the planetary system P torque transfers in two paths a and b (FIG. 1) through the carrier 6, the former being stiffer than the latter. In the stiffer path a torque transfers between the coupling 30 and the flexpin assemblies 32 through the end wall 20. In the weaker path b torque transfers between coupling 30 and the flexpin assemblies 34 through the end wall 20, the webs 24 and the end wall 22. The weaker path b, being considerably longer than the stiffer path a, sees greater deflection, and as a consequence, the offset axes Y for the flexpin assemblies 34 on the end wall 22 displace circumferentially from the offset axes Y for the flexpin assemblies 32 on the end wall 20. Even though the displacement is slight, without compensation the flexpin assemblies 32 and the pinions 8 on them will transfer more torque than the flexpin assemblies 34 and the pinions 10 on them.

The floating sun gear 2 provides the compensation that enables the two sets of flexpin assemblies 32 and 34 and their respective arrays of planet pinions 8 and 10 to share the transfer of torque generally equally. In this regard, owing to the helical cut of its gear teeth, each planet pinion 8 where it meshes with half of the sun gear 2, imparts a force that resolves into a tangential component $T_s$, a radial component $R_s$, and an axial component $A_s$. The same planet pinion 8 where it meshes with the ring gear 4 imparts a force that resolves into a tangential component $T_r$, a radial component $R_r$ and an axial component $A_r$. The tangential components $T_s$ and $T_r$ are equal and additive. They transfer the torque to the sun gear 2. The radial components $R_s$ and $R_r$ are equal and opposite and the sun gear 2 and ring gear 4 resist them. The axial components $A_s$ and $A_r$ are equal and are likewise resisted by the sun gear 2 and ring gear 4. Indeed, the axial forces $A_s$ and $A_r$ are additive and produce a couple that the deflection inhibitor 60 resists. Each planet pinion 10 experiences like forces, although the axial components $A_s$ and $A_r$ are reversed in direction compared to the axial components $A_s$ and $A_r$ to which the corresponding planet pinion 8 is subjected, this owing to the opposite helical cuts of the teeth on the two pinions 8 and 10. Thus, the sun gear 2 sees an axial forces $A_s$ imparted by the planet pinions 8 and opposite axial forces imparted by the planet pinions 10 of the other array. Since the sun gear 2 floats axially, it will seek a neutral position on the shaft 14 between the two pinions 8 and 10, that is to say a position in which the axial force $A_s$ imparted by the pinions 8 equals the axial force $A_s$ imparted by the pinions 10. With the axial forces $A_s$ for the two arrays of pinions 8 and 10 being equal, the tangential forces $T_s$ and $T_r$ for the two arrays of pinions 8 and 10 must also be equal. And the tangential forces $T_s$ and $T_r$ transfer the torque. Thus, the torque transfer through the planet pinions 8 equals the torque transferred through the planet pinions 10, this despite the fact that the carrier 6 deflects more at its end wall 22 (the weaker path b) than at its end wall 20 (the stiffer path a). When the torque transfer changes and with it a different deflection in the carrier 6, the sun gear 2 will seek a new neutral position between the planet pinions 8 and the planet pinions 10, but the two arrays of pinions 8 and 10 will again share the transfer equally.

Considering the operation from another perspective, the floating sun gear 2 will seek static equilibrium, which means it will float to a position that allows both thrust forces $A_s$ to become equal and opposite. If both opposing thrust forces $A_s$ are equal, then their corresponding tangential forces $T_s$ and $T_r$ will be equal, meaning that that equal torque will be transferred on both torque transfer paths a and b. In practical terms, the thrust force from the stiff path a will be greater than the thrust force from the weak path b at start and until the weak path b has deflected torsionally to a state where the torsional stiffness on both sides have become equal. In other words, the carrier 6 will have wound more on the weak side to achieve this heightened resistance to the forces applied, meaning that the gear contact in the mesh cycle of the weak side will be slightly advanced from the gear mesh cycle on the stiff side which can be accomplished because the two arrays of planetary gears 8 and 10 (one array on the stiff side and a second array on the weak side) are not connected and can operate independently.

While it is desirable to have the helix angles for the two arrays equal, although opposite, the angles may be different.

The floating sun gear 2 and the ring gear 4 may be used with planetary pinions 8 and 10 supported on a carrier having only a single end wall as depicted in U.S. Pat. No. 7,297,086, FIG. 1, which is incorporated herein by reference. Also the sun gear 2 may remain in a fixed axial position with respect to the carrier 6 and pinions 8 and 10 and the ring gear 4 allowed to float. When the sun gear 2 floats, it may be attached firmly to the shaft 14, even as an integral part of the shaft 14, in which event the shaft 14 should float and, of course, the sun gear 2 with it. The coupling 30 may be configured such that the weaker path extends only through the webs 24 and the end wall 22.

The invention claimed is:

1. A planetary gear system organized about a main axis and comprising:
    a shaft located along the main axis with its axis coinciding with the main axis;
    a sun gear mounted on the shaft and having first and second helical teeth arranged at opposite angles;
    a ring gear located around the sun gear and having first and second helical teeth presented inwardly toward the first and second teeth, respectively, of the sun gear, with the first and second teeth of the ring gear also being arranged at opposite angles;
    first planet pinions having helical teeth engaged with the first helical teeth of the sun and ring gears, whereby the first pinions will exert axial forces on the sun gear;
    second planet pinions detached from the first pinions and having helical teeth engaged with the second helical teeth of the sun and ring gears, whereby the second pinions will exert axial forces on the sun gear in opposition to the axial forces exerted by the first pinions, each second pinion being generally aligned with a first pinion along an offset axis that is substantially parallel to the main axis;
    a carrier having a first end wall located opposite the first pinions and a second end wall located opposite the second pinions and also webs connecting the first and second walls;
    first flexpin assemblies connecting the first planet pinions to the first end wall of the carrier such that the first pinions do not displace axially with respect to the carrier;
    second flexpin assemblies connecting the second planet pinions to the second end wall of the carrier such that the second pinions do not displace axially with respect to the carrier;
    the sun gear being mounted such that it can shift axially relative to the first and second pinions to assume a neutral position in which the axial forces exerted by the first pinions equal the axial forces exerted by the second pinions.

2. A planetary gear system according to claim 1 wherein each flexpin assembly comprises:

a flexpin that is cantilevered from the carrier end wall on which the flexpin assembly is mounted;

a sleeve attached firmly to the flexpin at the end of the flexpin that is remote from the carrier end wall, the sleeve extending back over the flexpin toward the end wall such that it is cantilevered from the end of the flexpin; and a bearing located between the sleeve and the pinion that is carried by the flexpin assembly.

3. A planetary gear system according to claim 2 wherein each flexpin assembly further comprises a deflection inhibitor located between its flexpin and its sleeve such that it prevents the sleeve from deflecting toward the flexpin in a plane defined by the main axis and the offset axis for the pinion that is carried by the flexpin assembly.

4. A planetary system according to claim 1 wherein the opposite angles at which the teeth of the sun and ring gears are arranged are equal.

5. A planetary system according to claim 1 wherein the sun gear is coupled to the shaft by mating splines.

6. A planetary system according to claim 1 wherein the shaft is supported in the carrier on bearings.

7. A planetary gear system comprising:

a sun gear located along a main axis and having first and second helical teeth arranged at opposite angles;

a ring gear having its center located along the main axis and having first and second helical teeth arranged at opposite angles;

first planetary pinions having helical teeth engaged with the first helical teeth of the sun and ring gears;

second planetary pinions detached from the first planet pinions and having helical teeth engaged with the second helical teeth of the sun and ring gears;

a carrier located between the sun and ring gears and supporting the first and second planetary pinions such that they rotate about offset axes that are substantially parallel to the main axis, the carrier including:

a coupling at which torque is applied to the carrier;

first flexpin assemblies establishing the offset axes about which the first pinions rotate such that the first pinions are confined axially on the carrier;

second flexpin assemblies establishing the offset axes about which the second pinions rotate such that the second pinions are confined axially on the carrier;

the carrier providing a first torque transfer path between the coupling, through the first flexpin assemblies, and to the first planet pinions, and a second torque transfer path between the coupling, through the second flexpin assemblies, and to the second planet pinions, with the first path being stiffer than the second path;

one of the gears being mounted around the main axis such that it can shift axially relative to the first and second pinions to assume a neutral position in which the axial forces generated by the mesh of the helical teeth on the first and second pinions with the helical teeth on that one gear are substantially equal and opposite and the torque transferred through the first pinions is generally equal to the torque transferred through the second pinions.

8. A planetary gear system according to claim 7 wherein each flexpin assembly comprises:

a flexpin that is cantilevered from a carrier end wall;

a sleeve attached firmly to the flexpin at the end of the flexpin that is remote from the carrier end wall, the sleeve extending back over the flexpin toward the end wall such that it is cantilevered from the end of the flexpin; and a bearing located between the sleeve and the of the flexpin assembly.

9. A planetary gear system according to claim 8 wherein each flexpin assembly further comprises a deflection inhibitor located between its flexpin and its sleeve such that it prevents the sleeve from deflecting toward the flexpin in a plane defined by the main axis and the offset axis for the pinion of the flexpin assembly.

10. A planetary system according to claim 7 wherein the opposite angles at which the teeth of the sun and ring gears are arranged are equal.

11. A planetary gear system according to claim 7 wherein the first and second planet pinions are organized in sets, there being within each set a first pinion and a second pinion, with the offset axes of the two pinions in the set being generally aligned.

12. A planetary gear system according to claim 11 wherein the carrier further comprises:

a first end wall supporting the first flexpin assemblies;

a second end wall supporting the second flexpin assemblies; and webs connecting the first and second end walls and extending between the sets of first and second pinions;

and wherein the first torque path passes through first end wall and the second torque path passes through at least the web and the second end wall.

13. A planetary gear system according to claim 12 wherein each flexpin assembly comprises:

a flexpin that is cantilevered from the carrier end wall on which the flexpin assembly is mounted;

a sleeve attached firmly to the flexpin at the end of the flexpin that is remote from the carrier end wall, the sleeve extending back over the flexpin toward the end wall such that it is cantilevered from the end of the flexpin; and a bearing located between the sleeve and the pinion of the flexpin assembly.

14. A planetary gear system according to claim 13 where the bearing is a double row tapered roller bearing.

15. A planetary gear system according to claim 12 wherein the second torque path also passes through the first end wall.

16. A planetary gear system according to claim 7 wherein the sun gear is capable of shifting axially, and the ring gear, planet pinions and carrier are in a fixed axial relationship with respect to each other.

17. A planetary gear system according to claim 7 wherein the opposite angles at which the teeth of the sun and ring gears are arranged are equal.

* * * * *